May 6, 1941. F. PUENING 2,240,575
APPARATUS FOR COKING COAL
Filed July 4, 1939 13 Sheets-Sheet 1

Fig. 1

Inventor:
F. Puening.

May 6, 1941.　　　　F. PUENING　　　　2,240,575
APPARATUS FOR COKING COAL
Filed July 4, 1939　　　13 Sheets-Sheet 10

Inventor
F. Puening.

Patented May 6, 1941

2,240,575

UNITED STATES PATENT OFFICE 2,240,575

APPARATUS FOR COKING COAL

Franz Puening, Claygate, England

Application July 4, 1939, Serial No. 282,785
In Great Britain July 16, 1938

23 Claims. (Cl. 202—105)

This invention relates to the coking of coal and is of particular advantage for gas companies of medium and small size, although is not exclusively limited to such application.

Although the gas industry is anxious to produce a more easily ignitable coke, and although such coke can be produced by medium as well as low-temperature coke ovens, neither of these types of oven is used except in a few of the very large plants, a fact which proves that these ovens have not yet been adapted to the needs of the average gas company.

Medium temperature ovens, being built of bricks, have the advantage of being almost completely safe against overheating, but their coking time is very long when oven chambers of normal width are used, so that a great number of ovens is needed. In order to reduce their coking time, it has been proposed to make the ovens very narrow, but in this case the coke tends to stick in the ovens, owing to insufficient shrinkage, resulting in damage to the ovens, and inasmuch as their narrow width makes it impossible to send a man into the ovens to repair them, ovens of this type have been abandoned again almost completely.

Low-temperature coking in iron retorts involves the probability of the coke sticking in the retorts and consequently the temptation for the operator to overheat the iron in order to make coke removal possible. To avoid both dangers, the modern low temperature oven is protected by a full set of fine recording instruments and automatic controlling machinery, including expensive fans for the recirculation of combustion gases, all giving rise to high costs. For the operation of such plant a staff of expensive operators is required, which is not available at small or medium plants and would be too costly. The high cost of these plants is further increased by the very low gas yield obtained, which in terms of B. t. u. per ton of coal, is only about 40% of that obtained by high temperature operation. To make up for this deficit, a small gas plant, which to-day carbonises 40 tons of coal per twenty-four hours, must coke one hundred tons on changing to low temperature coking requiring considerably more capital.

These drawbacks are not overcome even by the latest type of low temperature oven recently installed at a large gas plant, and using internally heated iron coking walls arranged within a common enclosure in which the distillate gases are collected, the walls being moved apart within the enclosure for the discharge of the finished coke. This type overcomes the danger of the coke sticking in the chambers, but necessitates all the coal chambers contained in the enclosure being operated at approximately the same time, requiring multiple expensive machinery, too expensive for a medium size gas plant. It also entails the loss of much distillate gases and their ignition when the enclosure is opened and high heat losses due to cold air entering the entire enclosure. Furthermore, it has been found that for small gas plants, where nevertheless at least three or four gas making units are needed in order to obtain the required uniformity of the gas quality, the oven, due to its many component parts, is too expensive.

It is an object of the present invention to provide an oven with which the average and smaller size gas companies may produce economically, and at will, either medium- or low-temperature coke.

Another object is to provide an oven the coking chambers of which are individually sealed from the atmosphere between the coking walls themselves; that is to say an oven in which the coking walls are not disposed inside an enclosure serving to collect the distillate gases, but one in which the walls themselves form a part of the seal for the coking chambers.

Another object is to provide an oven the individual chambers of which may be opened and closed independently of all other chambers.

Another object is to provide an oven of which the top and bottom and narrow side faces are accessible during the coking process.

Another object is to provide an oven the coking walls of which are constructed of brick or similar refractory material.

With these ends in view and in accordance with the invention, a coking oven comprises a coking chamber or preferably a plurality of coking chambers each formed between separable, internally heated coking walls, a set of one or more of said chambers being sealed from the atmosphere, and from the other chambers, between and by its coking walls.

Each coking chamber may be provided with its own individual off-take for distillate gases and/or liquids, and each coking wall with its own outlet for burnt heating gases, in which case adjacent chambers are separated by the heated wall between them. Or the coking chambers may be interconnected in groups or sets by communication passages in some of the walls, in which case there is only one distillate off-take for each set of intercommunicating chambers. Lastly all the coal chambers may be connected together as a single set by passages in all the walls except the two end ones, in which case there need be only one distillate off-take for the whole oven. These off-takes lead to a distillate collecting main, while the heating gas outlets lead to a waste gas flue, respectively, through flexible joints, so that the separating motion of the walls may be accommodated. Where there are more than one distillate off-take, each may be provided with its own valve, so that each chamber or set of chambers in turn may be disconnected from the collecting main whilst the chamber (or chambers) is discharged and recharged.

Preferably again each chamber is formed between two internally heated brick walls, each of which is held on its four narrow faces within iron frameplates, which may be resiliently pressed upon the brick wall, in order to obtain gas-tightness of the brickwork and simultaneously to allow for thermal expansion of the wall.

It will be noted that with this arrangement no common enclosure for the walls is required because each chamber constitutes a self-contained unit, being sealed along its top and bottom edges by removable doors and along its vertical edges preferably by pliable sealing material such as clay.

A preferred form of the invention will now be described with reference to the accompanying diagrammatic drawings, in which.

Figure 1:
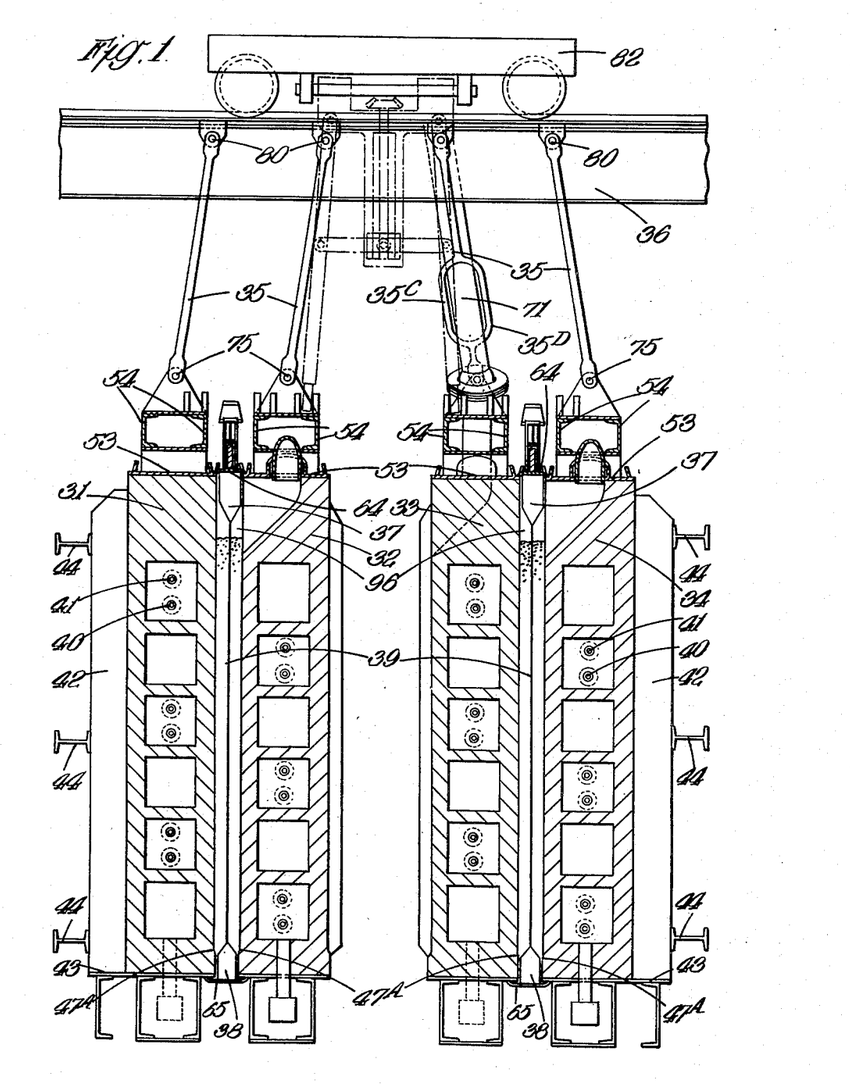
Figure 1 is an end elevation, partly in section, showing the general disposition of four internally heated brick coking walls, suspended so that any one coking chamber may be opened whilst the others are kept closed and in operation.
Figure 2:
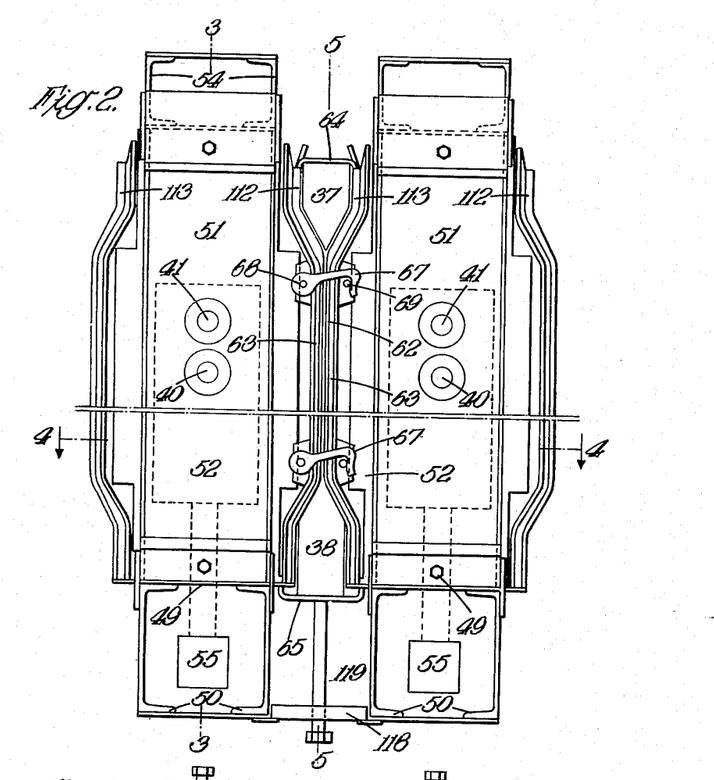
Figure 2 is a more detailed end elevation of two walls locked together in the closed position.

Figure 1 is an end view of four internally heated movable coking walls 31, 32, 33 and 34, each suspended by a pair of hangers 35 from a superstructure 36 in such manner that the coking chamber formed between any two adjacent walls may be opened by swinging the walls apart. In operation, the two walls between which the chamber is formed are, in a manner that will be described later, locked together, and the four edges of the coking chamber are sealed by means of removable doors 37 and 38 at the top and bottom respectively, and by clay luting along the vertical edges 39, while the walls are internally heated with the aid of gas and air supply pipes 40 and 41 respectively entering each wall through both of its narrow vertical faces.

The first and last of these movable walls are protected against heat losses to the atmosphere by heavy layers of insulating material 42, which are supported upon extensions 43 of bottom frameplates and are held in position against the movable walls by beams 44.

Referring now to Figures 2, 3, 4 and 5, which show further details of a construction of one coking chamber, each wall is constructed of refractory brick 45 (Figure 3) and is formed with an internal space 46 through which heating gases are circulated. The two largest opposite faces of the brick walls are also formed with depressions as at 47 (Figure 4), such that when two walls are placed face to face the depressions together form coking chambers 48.

Figure 3:
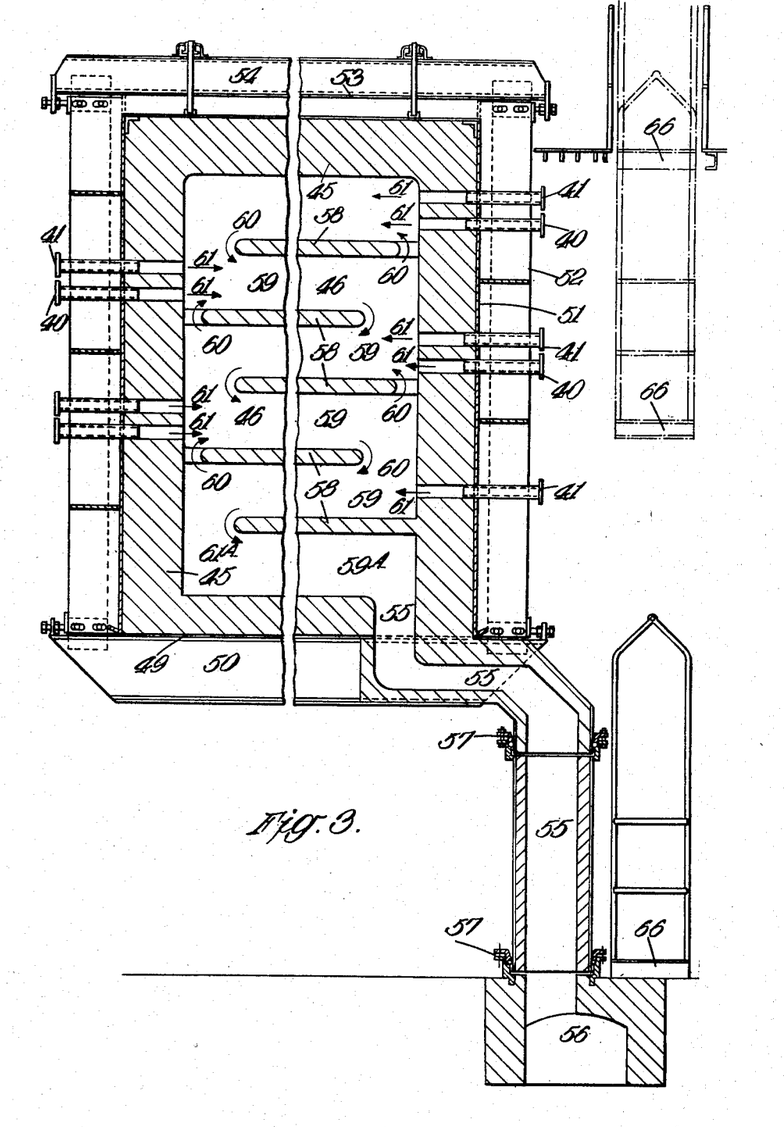
Figure 3 is a section on the line 3—3 of Figure 2, showing the inside of an internally heated wall.
Figure 5:
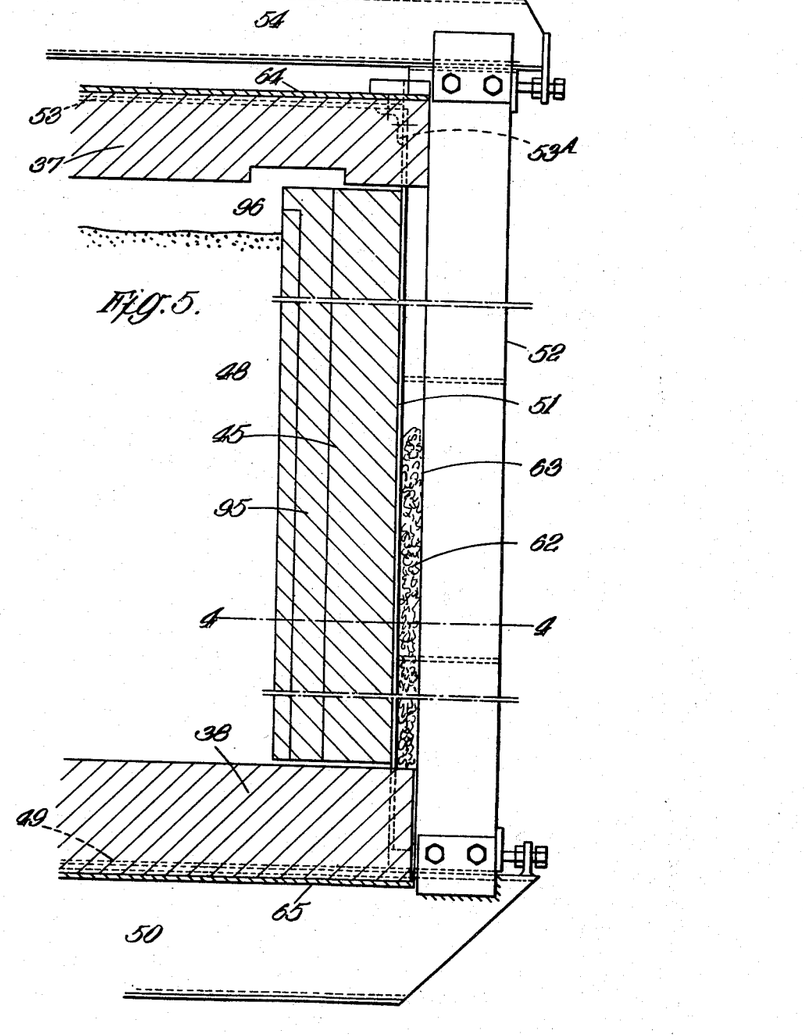
Figure 5 is a section on the line 5—5 of Figure 2, showing the inside of a coking chamber.

Each brick wall is surrounded on its narrowest faces, and held together by, a complete iron framework comprising lower frameplate 49 and two girders 50, side frameplates 51 with side girders 52, and top frameplate 53 with top girders 54. The girders are connected together at the four corners in a manner allowing for thermal expansion of the brick wall. As shown in Figures 3 and 5 for example, each corner of the brickwork is surmounted by an angle piece 53A which is secured to the top and side frameplates 53 and 51 respectively by bolts passing through slotted holes in the frameplates.

Figure 3A:
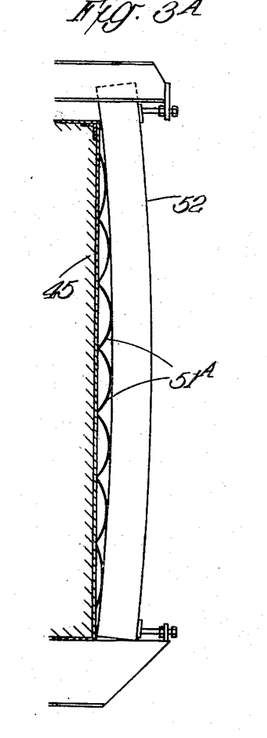
Figure 3A shows a modification of the arrangement shown in Figure 3.

Referring particularly to Figures 3 and 3A, it will be appreciated that when the wall is heated the expansion of the brickwork enclosed in the side frameplates may not be quite uniform at all heights, also that since the side girders 52 are held at the tops and bottoms only they may bend, in which case the brickwork at the centre portions of the wall would be under less pressure than that at the tops and bottoms of the wall. In both events a bulging of the wall might occur, and, in order to prevent this, it is advantageous to insert a series of curved leaf springs 51A (Figure 3A), semi-elliptic, for example, between the side frameplates 51 and the side girders 52.

Figure 4:
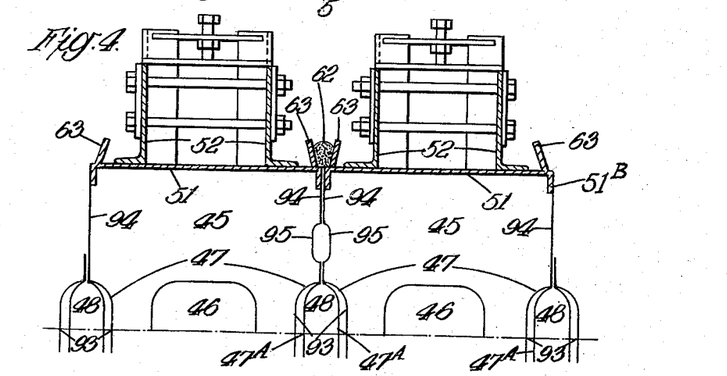
Figure 4 is a section on the line 4—4 of Figure 2.

To avoid the slightest possibility of the bricks slipping sideways out of the grip of the encircling side, top and bottom frameplates when the walls are in operation, all the frameplates may be formed, as shown in Figure 4, with right-angle flanges 51B which turn around the edges of the brickwork 45 and grip from the sides. In order to allow the faces of the walls to be brought in contact with each other the brickwork is formed with its corner edges recessed to take the flanges.

Referring now to Figure 3, the distance between the two bottom girders 50 is sufficient to permit an outlet flue 55 to be accommodated between them. The outlets 55 from the several walls are each connected with a common flue 56 through flexible sealed joints 57, which accommodate the spreading motion of the walls. The outlet flues 55 of successive walls are preferably staggered, i. e. arranged alternately at the right- and left-hand sides, those of walls 31 and 33 being placed on the left-hand side of the wall, and those of walls 32 and 34 are placed on the right-hand side (see also Figure 1), thus providing sufficient space to give easy access to the walls and to the flexible joints 57. Waste gases collected in the common flue 56 may be led to a waste heat boiler or to a heat recuperator (not shown). If desired the outlet flues 55 may leave through the sides of the walls, thereafter being turned down vertically.

Each of the internally heated walls is formed with horizontal partitions 58 dividing its hollow space into flues 59 in which gas and air, admitted through the supply lines 40, 41 are burned and circulated. The entering fuel and air are injected into the flues with considerable velocity, thus creating a lively recirculation of the combustion gas already present in the flues, whereby there is achieved an evenly distributed coking heat. Arrows 60 indicate how the previously burned gases are recirculated by the fresh gases and the air entering through the supply pipes in the direction of arrows 61 finally reaching the lowest flue 59A and leaving through outlet flue 55.

As can be seen from Figure 1, corresponding supply lines 40 and 41 of successive walls are arranged in staggered formation, that is alternately at the right- and left-hand sides of successive walls, to allow of easy access to the pipes and walls.

Figure 15:
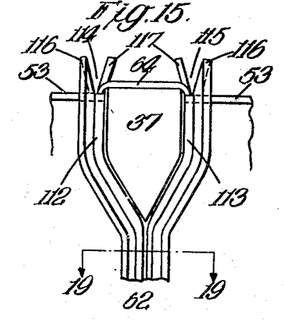
Figure 16:
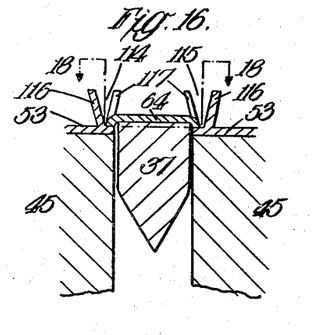
Figure 16 is a section on the line 16—16 of Figure 14.
Figure 17:
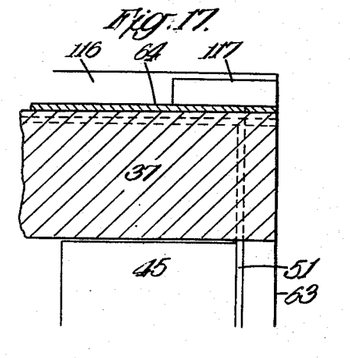
Figure 17 is a section on the line 17—17 of Figure 14.
Figure 18:
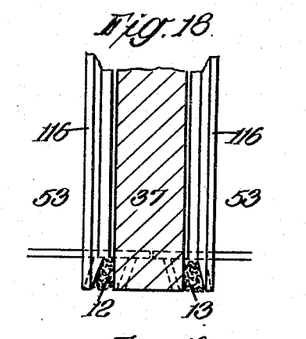
Figure 18 is a section on the line 18—18 of Figure 16.
Figure 19:
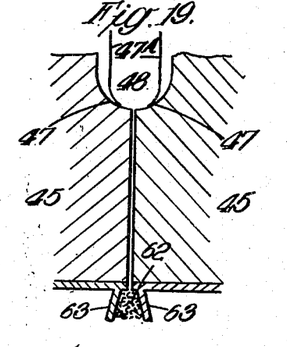
Figure 19 is a section on the line 19—19 of Figure 15.
Figure 20:
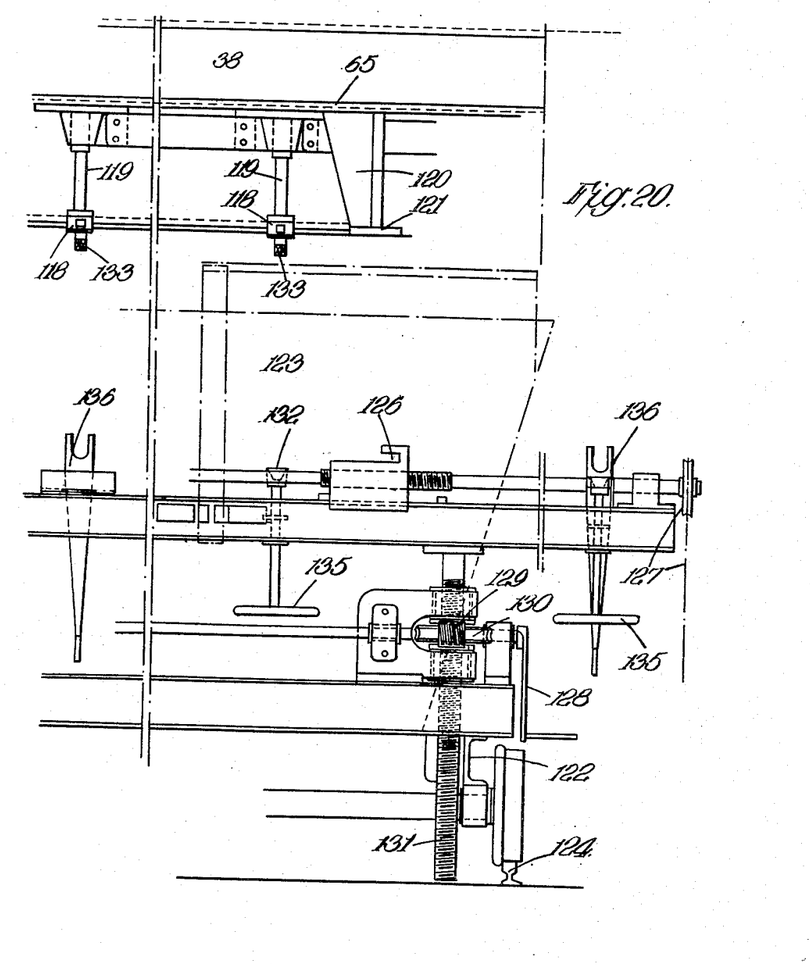
Figures 20 and 21 are front and side elevations respectively of means for removing the lower doors of the coking chambers.
Figure 21:
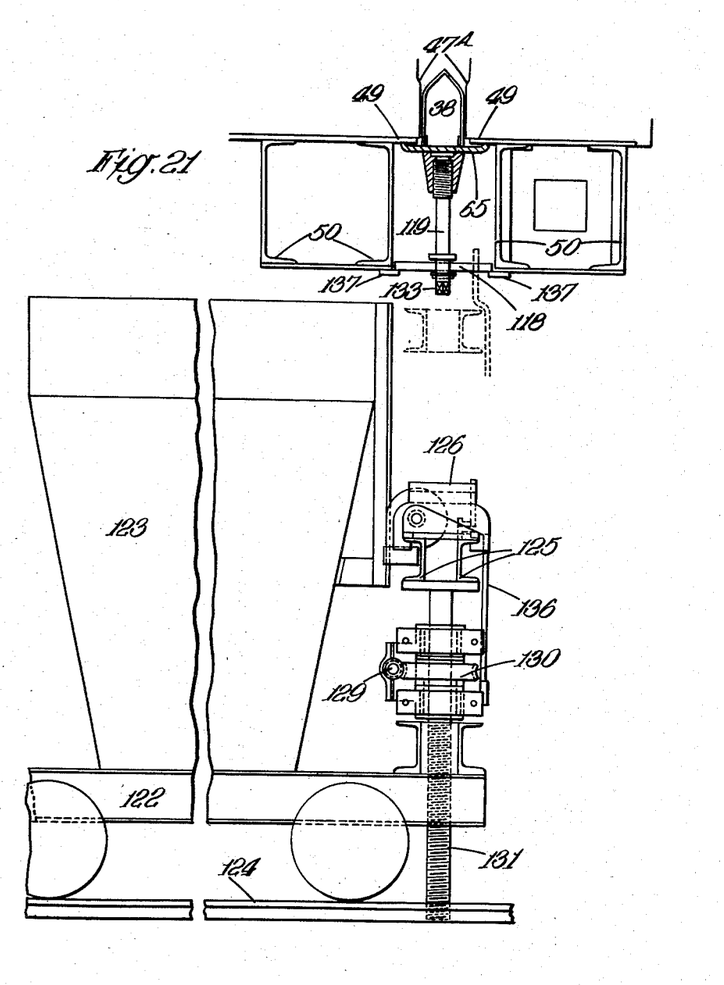

Each coking chamber is completely sealed against the escape of distillate gases into the atmosphere or into another chamber; it is provided with its own top and bottom doors 37 and 38 respectively, both being heat insulated and of wedge shape, and its vertical edges are sealed by the application of moist clay luting 62 pressed into the groove formed between flanges 63 formed on the side frameplates 51. At the top and bottom of the vertical edges of the chamber the groove formed between the flanges 63 is bifurcated (see Figure 15) in such manner that the clay luting is passed around the wedge-shaped top and bottom doors 37 and 38 until it is in contact with top and bottom door plates 64 and 65 respectively. The top and bottom doors 37 and 38 respectively are in the form of wedges consisting mainly of insulating material and extend somewhat deeply into the coking chamber in order to keep the coal and its distillates away from colder parts. In the case of very tall ovens the application of the clay luting may be facilitated by the provision of an electrically operated lift 66 (Figure 3), on which the operator rides when applying the luting.

Figures 6, 7, 11:
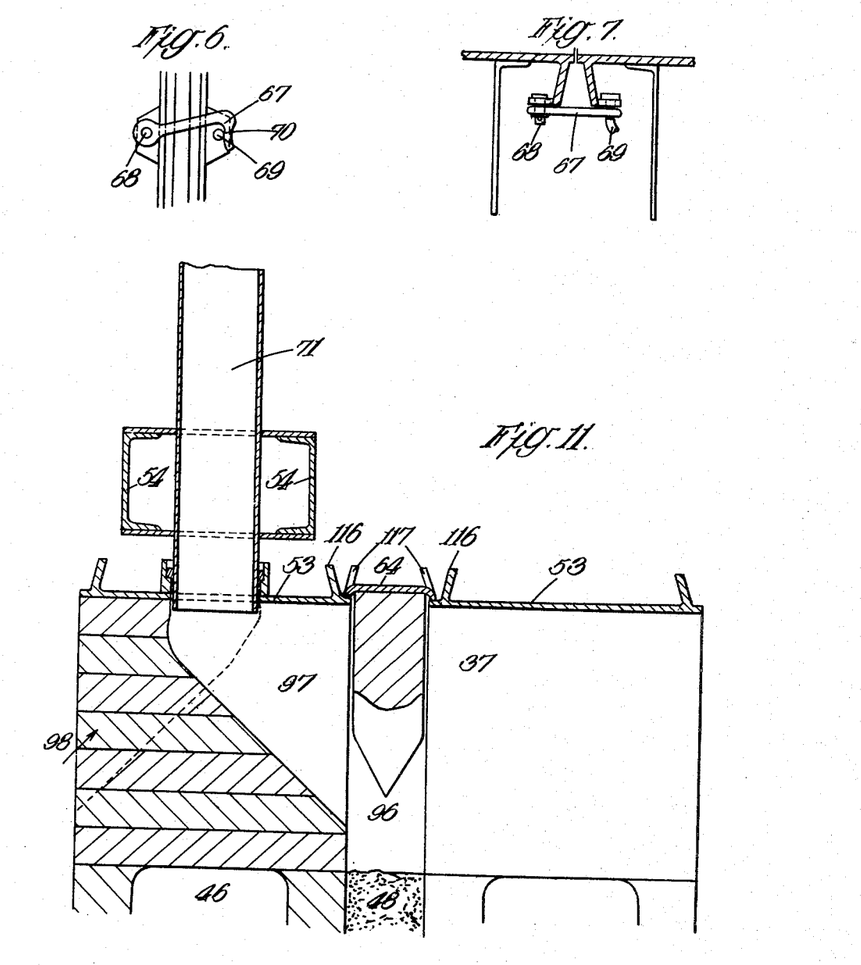
Figures 6 and 7 are an elevation and plan respectively, of the means for locking together two walls.
Figure 11 is a fragmentary sectional view of an alternative arrangement in which a pair of coking chambers are provided with a common gas off-take.

Two adjacent walls are clamped together by means of hooks 67, rotating around bolts 68, which can be anchored on pins 69. The hooks are shown in greater detail in Figures 6 and 7, and it will be noted that the hook 67 is formed with a cam surface 70, which, when the hook is forced over the pin 69, serves to draw the walls together. Where, however, a set of chambers are opened and closed simultaneously, fastening means for individual chambers become superfluous and it is sufficient to provide anchoring means for the set as a whole. Thus, for example, long bolts extending horizontally over all chambers of a set serve the purpose, and in this case the bolts, when tightened, may be used to seal one side frameplate against the next. Sealing is assisted by providing adjustable metal edges for the frameplates or by fitting an asbestos gasket between the contacting edges of two frameplates.

Figures 8, 22, 23, 24, 25, 26:
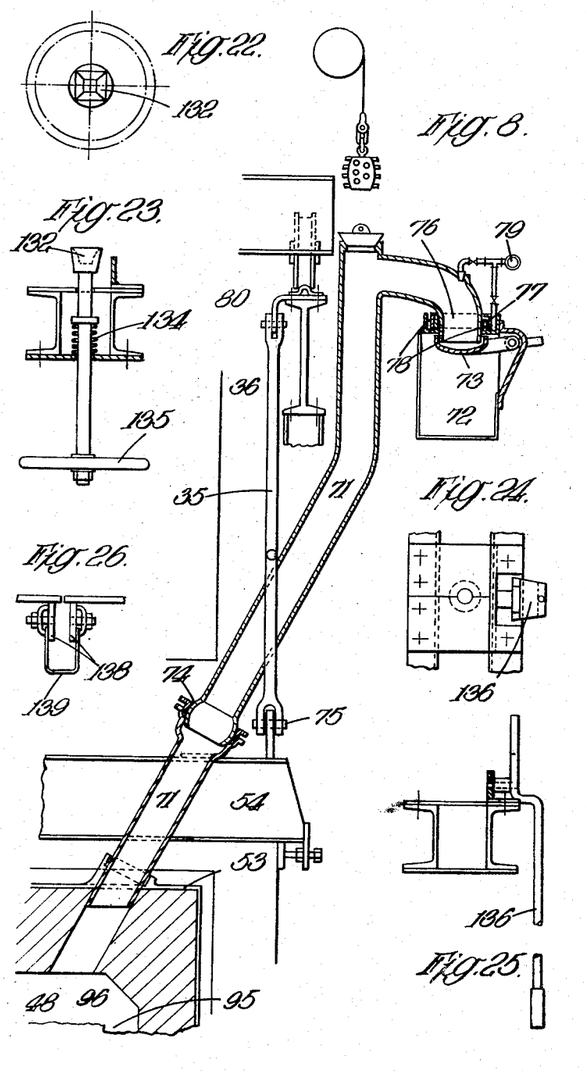
Figure 8 is a section taken through the gas off-take of a coking chamber.
Figures 22 and 23 are a plan and elevation respectively of a detail shown in Figures 20 and 21.
Figures 24 and 25 are a plan and elevation respectively of an other detail shown in Figures 20 and 21.
Figure 26 shows a modification of the means for sealing a coking chamber.

As shown in Figure 8, each coal chamber 48 is equipped with its own individual off-take 71 for gas distillates. The off-take 71 is connected with a common collecting main 72 through a valve 73 permitting the disconnection of any one chamber from the main while that chamber is opened for the discharge of coke, the other chambers meanwhile remaining connected to the main and continuing their coking operation. In order that the off-take 71 may not interfere with the work of luting the vertical edges of the chamber, it is taken through the top frameplate 53 between the top girders 54. Alternatively the off-take may be secured to the top cover.

As in the case of the waste gas outlets 55, the gas distillate off-takes 71 are also preferably staggered, those of the chambers 31 and 33 being arranged on the left and those of chambers 32 and 34 being arranged on the right, so as to provide better accessibility to the chambers generally.

Two flexible joints are provided in each off-take 71, the lower one 74 being a dry-ball joint located at the elevation of the lower pivot point 75 of the hangers 35, while the upper flexible joint 76 is in the form of a water seal having a sleeve 77 dipping into a water-filled annular cup 78 fed from a water main 79. This upper seal 76 is located at the elevation of the upper pivot point 80 of the hangers 35; with this arrangement, when a wall is swung out, the motions of the hangers 35 and the off-takes 71 are parallel and therefore do not interfere one with the other. The lower portion of each hanger 35 is split into two branches, 35C and 35D (see Figure 1), through which the off-take 71 passes.

Figure 9:
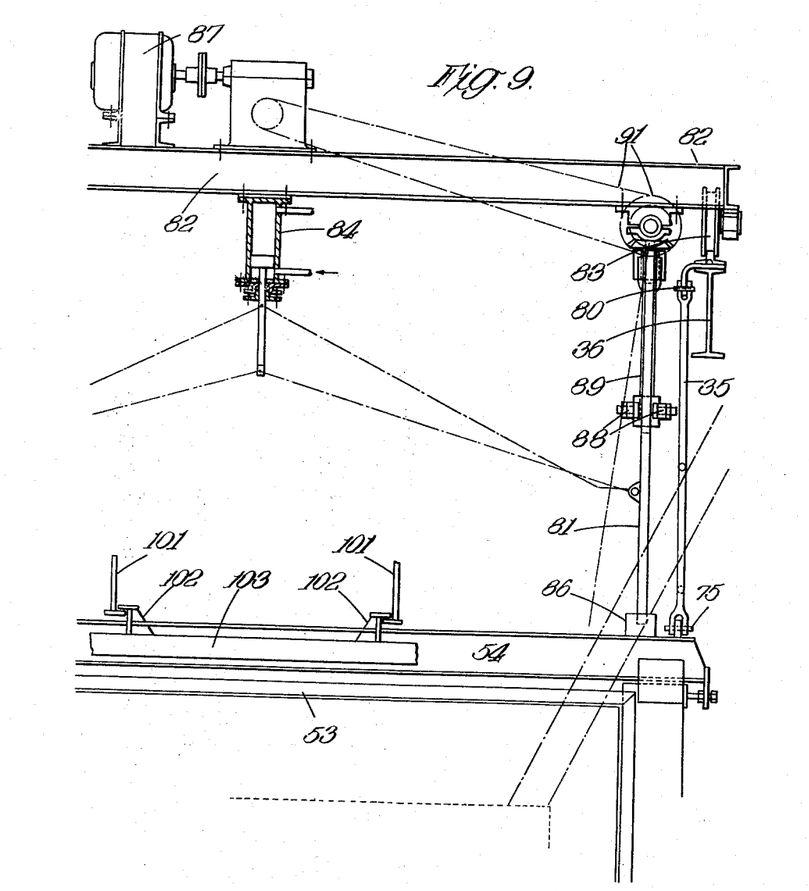
Figures 9 and 10 are front and end elevations respectively of means for spreading and closing the walls.
Figure 10:
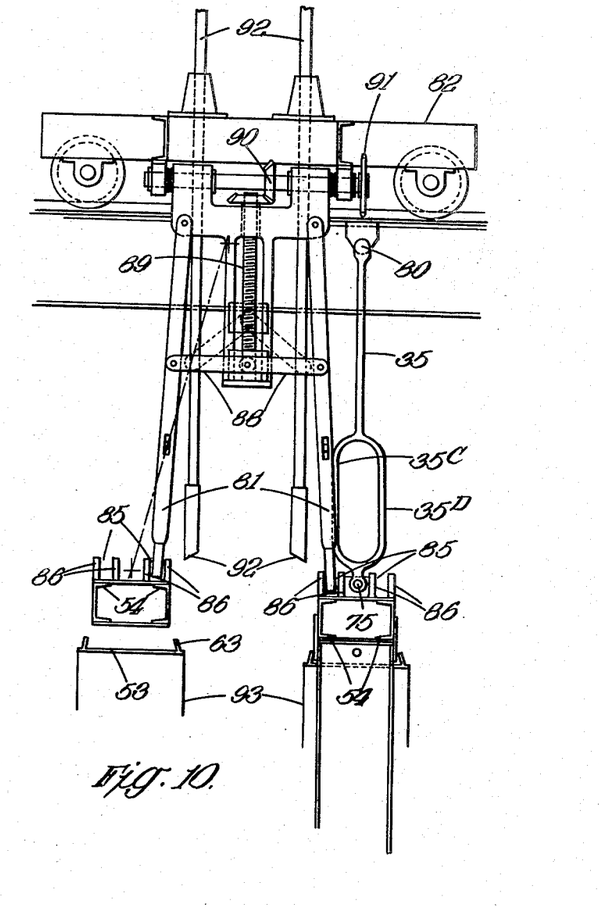
Figure 12:
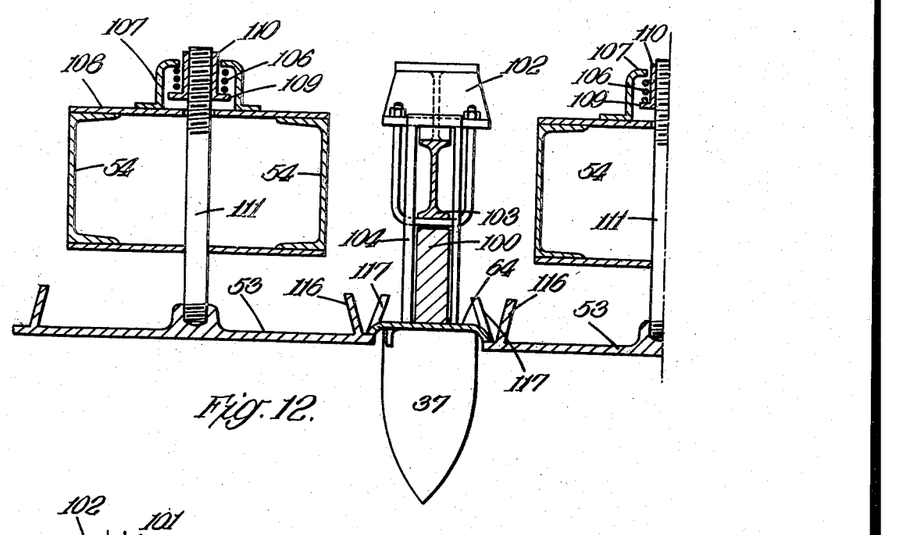
Figures 12 and 13 are end and front sectional elevations respectively of means for pressing the top cover plate upon a coking chamber.
Figure 13:
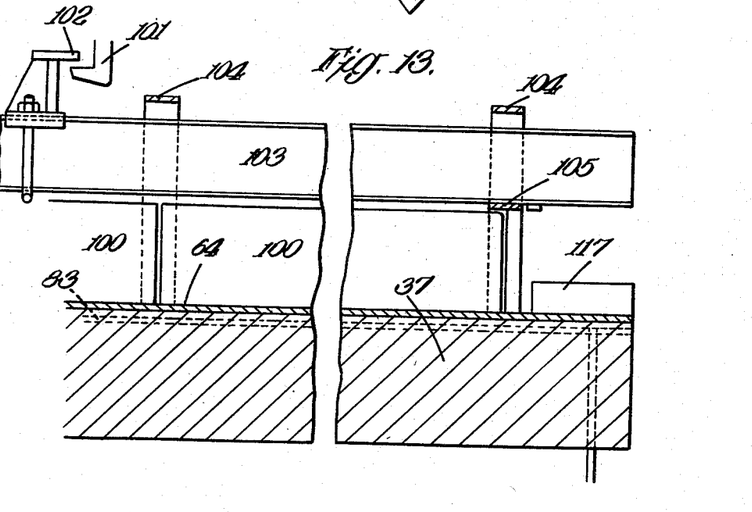
Figure 14:
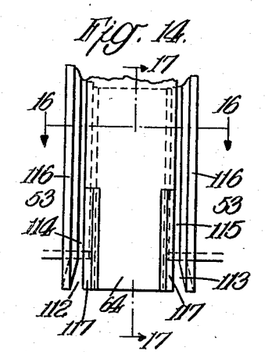
Figures 14 and 15 are a plan and end elevation respectively of a corner of a coking chamber.

Figures 9 and 10 illustrate the preferred means for spreading apart and closing the walls. The means comprise a pair of levers 81 pivoted upon a travelling truck 82 running on rollers 83 supported on superstructure 36, on which the hangers 35 are also supported. The pivoted levers 81 can be lowered into and withdrawn from recesses 85 formed between flanges 86 on the top girders 54, by suitably operating a hydraulic piston and cylinder 84. After levers 81 have been moved into recesses 85 they can be forced apart by means of a toggle linkage system operated from a motor 87 carried on the truck 82. The toggle links 88 are forced downwards by rotation of screw 89 driven through bevel gears 90, and chain and chain-wheel 91, from the motor 87.

The truck 82 preferably also carries a set of scraping tools 92, which can be lowered into the coking chamber so as to scrape from the walls thereof any adhering coke. These tools not only scrape over the coking surfaces 93 (Figure 4) of the coking chambers 48, but also over the moulded flanges 63 of the vertical side frameplates 51 and the brick surfaces 94 including the vertical channels 95 lying between the flanges 63 and the coking chambers proper, on which surfaces pitch deposits and uncoked coal tend to gather.

Considering the four walls shown as the coking oven, when the end chamber is to be opened and the end wall moved away from the other three, the one end wall will be moved through a greater distance than the remaining three owing to the difference in weight, whilst if the centre coking chamber be opened up, the two sets of two walls on either side will be moved through equal distances because the two sets of walls are of equal weight. The truck 82 carrying the spreading machine adapts its position automatically to these various motions of the walls, simply rolling on its track and taking up a position central with respect to the two coking faces of the chamber opened. It follows that the coke scraping tools 92 are always in the correct position for their work when the spreading motion has been completed.

Closing of the walls is effected by reversing motor 87, and if desired the closing motion may be assisted by the provision of power-operated means for pressing the walls together before the hooks 67 are forced over the pin 69.

In the case of comparatively large plants, it is possible to provide machinery capable of removing the top covers and bottom doors from all chambers of an oven simultaneously. The chambers are then moved apart, either at the same time or one immediately after the other, and are re-charged with coal simultaneously. In this manner, large quantities of coal can be charged and coke discharged upon each operation.

Figure 27:
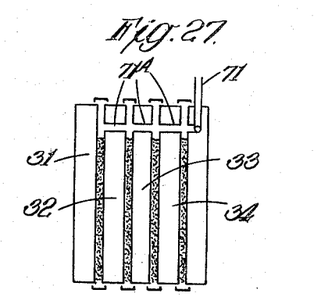
Figure 27 illustrates an oven comprising four individually operable coking chambers all served by the same off-take for distillate gases.

When operating machinery is provided for charging all chambers simultaneously, it evidently becomes unimportant whether the chambers are sealed against each other or not. In fact, all chambers can then intercommunicate with one another as shown in Figure 27, with only one or perhaps two off-take pipes 71 for distillates. All the chambers must, however, be sealed against the atmosphere.

The communications between the chambers are then preferably in the form of passages 71A located in the uppermost parts of the walls. Such a passage may also be provided in an end wall, thus connecting the chambers through the end wall to the gas collecting main.

Figure 28:
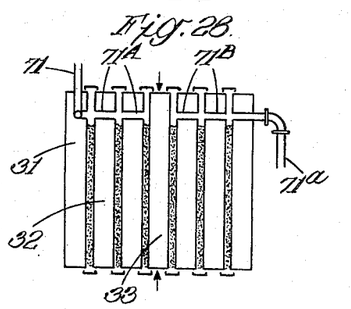
Figure 28 shows an oven the chambers of which are divided into two sets, each set being provided with its own gas off-take and the two sets being sealed one from the other.

As an alternative, it would be possible (as shown in Figure 28) to fix the position of one wall 33, for example, one at the centre, and to move all the other walls away from this fixed wall. In this case machinery would be desirable for spreading first one half of the walls, and thereafter the other. Furthermore, with such an arrangement it would be convenient to provide two sets of communication passages 71A and 71B in the spaces above the charge, one for each half set of the coking chambers, the centre immovable wall being the only one without such a passage, and the end, or outside, chamber in each half set being provided with a gas off-take 71 or 71A which, through the communication passages, serves all the chambers in a set.

Figure 29:
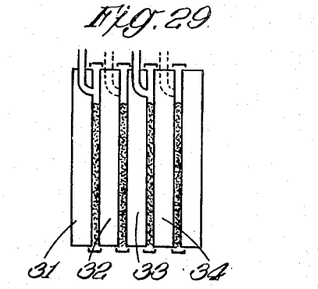
Figure 29 shows an oven comprising four coking chambers each of which is sealed from the others, and from the atmosphere, between its coking walls, each chamber having its own gas off-take.

Figure 29 is a diagrammatic illustration of an arrangement similar to that of Figure 1, in which each chamber has its own off-take 71, and is sealed from the atmosphere and all other chambers between its coking walls.

Referring again to Figure 4 the intermediate surfaces 94 of the walls are preferably formed with vertical channels 95 which serve as flues for distillate vapours penetrating through the narrow joints between abutting brick walls. The gases entering these channels 95 pass upwardly into the distillate collecting space 96 (Figure 1) and thence through the off-take 71 into the main 72.

In larger plants where the time interval available for the emptying and recharging operations is short, it would be desirable to arrange to empty and recharge two or more chambers simultaneously. For this purpose two adjoining coking chambers may be connected together as shown, for example in Figure 11, one off-take 71 serving the two chambers via passages 97 and 98, or as shown in Figures 27 and 28.

The top and bottom doors 37 and 38 respectively and the means for opening and closing them will now be described in greater detail, the top door being illustrated in Figures 12 to 18. The door 37 itself consists of a metal cover plate 64, the edges of which are forced down upon the edges of the top frameplate 53. The required pressure is supplied by a series of iron weights 100 (Figures 12 and 13) disposed along the top of the cover plate 64, whereby an even distribution of pressure is achieved, even if the edges of the cover plate 64 are not quite parallel with the top frameplate 53. The cover plate 64 is raised by hoisting two hooks 101 (see also Figure 9) engaging brackets 102 attached to beam 103, which is movable within a series of rectangular frames 104 and the end ones of which have partitions 105. When the hooks 101 are hoisted, beam 103 moves upward until it is in contact with the tops of the frames 104, after which the cover plate 64 is lifted. The provision of lost motion between the beam 103 and the rectangular frames 104 has the advantage that when the cover plate 64 is pressed down it can adapt itself to the contour of the top surfaces of the frameplate 53, even though the latter may be bent as a result of uneven heat expansion of the brickwork.

The top frameplates 53 are also themselves elastically pressed upon the top of the brickwork 45 by means of a series of springs 106 (Figure 12) each of which is compressed between a collar 107 (secured to the top girders 54 by plate 108) and a flange 109 of a sleeve 110 threaded on to bolt 111 secured to a bearing on the top frameplate 53. The pressure exerted by the spring 106 can be adjusted by screwing the flanged sleeve 110 up or down on the bolt 111. Two rows of such springs along the top of the frameplates may be used if necessary.

The clay seal 62 applied to the vertical edges of each coking chamber 48 divides as it approaches the top and bottom doors 37 and 38 respectively and branches into two grooves 112 and 113 which, in the case of the upper door 37 extend upwardly around the door and are turned through a right angle above the door, continuing horizontally as grooves 114 and 115 above the cover plate 64. The grooves are formed between long flanges 116 on the top frameplate 53 and short flanges 117 on the cover plate 64.

The mechanism for operating the bottom door is illustrated in Figures 20 to 24.

The bottom door 38 comprises a cover plate 65 pressed upwards so that its edges bear against the bottom frameplate 49, the door being held in this position by a series of rotatable anchor members 118 and being forcibly pressed against the bottom frameplate 49 by rotation of screws 119, which bear against the anchor members 118 and abut against the cover plate 65. Preferably several of such screw members are provided.

The mechanism for opening the bottom door 38 comprises two brackets 120, secured to the door, having flanges 121. A car 122 carrying a coke bin 123 travelling on tracks 124, is equipped with two guide beams 125, on which slide a pair of jaws 126, which can be moved forward to engage the flanges 121 on the door 38 by operation of a chain and chain-wheel 127 after the guide beams 125 have been raised to the appropriate height. The raising of the beams 125 is achieved by rotating a crank 128, which rotates worm 129, wormwheel 130 and screw 131, rotation of which serves to raise or lower the beams 125.

At the same time that the guide beams 125 are raised to their top position a tapered cup 132 of square section engages shank 133 of corresponding section, spring 134 (Figure 23) being provided in case the shank 133 does not enter the cup 132 smoothly. Thereafter handwheel 135 is rotated, causing proper engagement between cup and shank and rotation of screw 119, which abuts against the bottom door 38, thus relieving the pressure on the door from anchors 118. Each anchor 118 is then turned by means of a lever 136, which is bifurcated at the top so that it may straddle the anchor member 118. By this means the anchor member is moved away from its supports 137, so that the anchor member 118, screw 119 and the door 38 may all be lowered. This is achieved by turning crank 128 so as to lower the beam 125, after which the coke bin 123 is moved under the chamber and the walls are spread apart. Premature dropping of the coke is prevented by virtue of the curvature 47A at the bottom of the brick walls (see Figures 4 and 21).

Many variations of the above described form of the invention, falling within the scope of the appended claims, will be apparent to one skilled in the art. For example, the invention is not limited to brick walls, neither is it limited to medium temperture coking, although primarily intended for this process. It is evident that the oven can be used for temperatures somewhat higher than medium temperatures and alternatively it can be used for low temperatures, in which case the walls could be made either of bricks or of low carbon steel, the steel being protected against local overheating by provision of special combustion chambers built into each wall, whilst the heat transfer and the recirculation of the heating gases through the walls could be increased by means of a fan inside each wall or by a fan outside and common to all walls. The air supply pipes 41 may be omitted and the air be drawn into the walls by means of high pressure gas burners aspirating the air or by chimney draught, acting through the waste heat flue 55, or by both.

Instead of being suspended from hangers, the walls may be mounted so as to be movable upon rollers, or to glide on lubricated rails. Alternatively, the hangers 35 (Figure 1) may be suspended upon blocks sliding or rolling on the girder 36.

The internal flues of the walls may be horizontally or vertically disposed and if vertical then the burners can be located on top of and below the walls, or below the walls only, and in the last two cases the waste heat flue 55 would be located in the vertical side faces between the girders 52.

Instead of providing clay luting grooves on the vertical edges of the walls, it is possible to employ mechanically operated narrow doors, provided with metal edges which are pressed against the iron side frame plates in a manner similar to the bottom doors. In this case clay lute seals may be applied in the four corners.

Luting material may also be employed to assist in the sealing of the top cover and/or the bottom door.

In case of a coal yielding a heavy coke, which easily drops from the coke chamber when its walls are spread apart, only a very small spreading motion is required and in this case the vertical side flanges 138 (Figure 26) may be permanently interconnected by means of a flexible membrane 139, the top and bottom ends of which are preferably sealed to the bottom and top doors by clay lute.

A great number of advantages are inherent in these new ovens. By making all coal chambers independent of each other and by omitting a common enclosure, the oven is very much simplified, and its walls made far more accessible. This is of special importance in the case of brick walls, because, for example, the joints and any cracks in the brickwork can be reached and sprayed with thin cement from all sides in order to keep them gas-tight. The iron framework enclosing the brickwork is visible and accessible, the pipes for supplying fuel-gas and air or the flues for supplying recirculated heating gases to the walls now enter the walls directly without first passing through enclosure walls. Flexible or slidable seals previously required at the points where these pipes and flues penetrate the enclosure walls are no longer needed. The gas burners are now short, and accessible. The various means for sealing the heating walls against each other are visible and accessible, whilst the replacement of a wall has become very simple.

The loss of valuable distillates is reduced, because only the small volume of gas contained in one chamber above the coal is lost, when opening a cover. With each chamber being emptied separately, the number of charges per day is greater so that a small gas plant obtains a more uniform gas quality. Furthermore, the new oven has a higher coking capacity because, while one chamber is being recharged, the others continue their work of coking undisturbed.

The cost of the oven operating machinery is low because coke removing, coal charging and coke receiving means are required for one chamber only, although for a large plant a second set of machines is installed or a machine capable of handling two or possibly three chambers at one time may be used.

By providing movable brick walls with narrow brick coking chambers between them and operating them at medium temperatures, a most favourable gas-making capacity is reached for the average plant. The new brick walls can be of quite large size, because the iron frames and girders surrounding them are in contact with the atmosphere and safe against overheating. The thickness of the bricks used in building the new walls can be less than for ovens with non-movable rigid walls, because in the latter case the coke is pushed from the ovens and therefore the oven walls are exposed to greater lateral pressure, which often deforms them; while in the new oven, the coke either drops away from the walls when spreading them apart or is easily removed by a scraper. This is important, especially in the case of expanding coals, which often cause the destruction of rigid ovens. The use of thinner bricks in the movable walls makes the oven cheaper and increases its coking speed and widens its applicability because it improves the coke-forming quality of the poorly coking coals. The use of thin bricks instead of iron in the construction of low temperature ovens also reduces their initial and maintenance costs, since the bricks do not oxidise.

The new oven facilitates the introduction of medium and low-temperature coking at the average gas plant, because it can first be operated at a rather high range of medium temperature coking, so that its coking capacity as well as its gas yield per ton is high, keeping the investment low at the beginning. Gradually more ovens can be added and their operating temperature lowered, increasing the tar yield and obtaining the desired ignitability of the coke, also giving the gas company time to find markets for its rising coke production. There is also the favourable possibility of returning to the higher operating temperatures every summer, when coke is not in demand, producing the required volume of gas together with a minimum of coke.

I claim:

1. A coking oven including a plurality of coking chambers each formed between hollow coking walls, means for passing heating gases through said walls, means for varying the distance between adjacent walls, and means for sealing each chamber individually from the atmosphere, each intermediate coking wall acting as a separating wall between two chambers, and an external distillate offtake for each chamber.

2. A coking oven including a plurality of coking chambers each formed between hollow coking walls, means for passing heating gases through said walls, means for varying the distance between adjacent walls, and means for sealing each chamber individually from the atmosphere, some of the coking walls acting as separating walls, while walls intermediate thereof are formed with passages interconnecting the chambers, and an external distillate offtake for each set of inter-connected chambers.

3. A coking oven including a plurality of coking chambers each formed between hollow coking walls, means for passing heating gases through said walls, means for varying the distance between adjacent walls, and means for sealing each chamber individually from the atmosphere, the coking walls intermediate the end walls being formed with passages for inter-connecting the chambers, and an external distillate offtake for said inter-connected chambers.

4. A coking oven including a plurality of coking chambers each formed between hollow coking walls, means for passing heating gases through said walls, means for varying the distance between adjacent walls so that any one chamber may be opened or closed independently of the others, and means for sealing each chamber individually from the atmosphere.

5. A coking oven including a plurality of coking chambers each formed between hollow coking walls, inlet and outlet pipes to said walls serving to pass heating gases through the walls, a flexible joint in each of said pipes serving to accommodate the motion of the walls, means for varying the distance between adjacent walls, and means for sealing each chamber individually from the atmosphere.

6. A coking oven comprising coking chambers each formed between hollow coking walls constructed of non-metallic refractory material such as firebrick, means for passing heating gases through said walls, means for varying the distance between adjacent walls, and means for sealing each chamber individually from the atmosphere.

7. A coking oven comprising coking chambers each formed between hollow coking walls constructed of non-metallic refractory material such as firebrick, metal frameplates secured around the four narrow faces of each wall, means for passing heating gases through said walls, means for varying the distance between adjacent walls, and means for sealing each chamber individually from the atmosphere.

8. A coking oven including a plurality of coking chambers each formed between hollow coking walls, inlet and outlet pipes to said walls serving to pass heating gases through the walls, corresponding pipes of successive walls being arranged in staggered formation in order to give good access to the walls, means for varying the distance between adjacent walls, and means for sealing each chamber individually from the atmosphere.

9. A coking oven including a plurality of coking chambers each formed between hollow coking walls, means for passing heating gases through said walls, means for varying the distance between adjacent walls, means for sealing each chamber individually from the atmosphere, an external distillate offtake serving at least one of said chambers, and a valve in said offtake so that the set of chambers can be disconnected from the main for the purpose of being charged or discharged.

10. A coking oven including a plurality of coking chambers each formed between hollow coking walls, means for passing heating gases through said walls, means for varying the distance between adjacent walls, means for sealing each chamber individually from the atmosphere, an external distillate offtake serving at least one of said chambers, and a flexible joint in said offtake serving to accommodate the motion of the walls.

11. A coking oven including a plurality of coking chambers each formed between hollow coking walls, means for passing heating gases through said walls, means for varying the distance between adjacent walls, means for sealing each chamber individually from the atmosphere, and a plurality of external distillate offtakes each serving a set of at least one of said chambers, successive offtakes being disposed in staggered relationship in order to give good access to the walls.

12. A coking oven comprising a coking chamber formed between two hollow internally heated coking walls which are relatively movable with respect to each other, each of said walls on its outer narrow non-coking faces exposed to and accessible from the atmosphere, an offtake for distillate gases for said coking chamber and means for sealing the chamber from the atmosphere along its outer narrow faces.

13. A coking oven comprising hollow internally heated coking walls which are relatively movable with respect to each other, said walls being exposed to and accessible from the atmosphere on their outer narrow non-coking faces, a carbonizing chamber sandwiched between said walls, a continuous ring of sealing means completely surrounding the outer narrow faces of the carbonizing chamber, said sealing means being exposed to and accessible from the atmosphere, said sealing means comprising a removable charging and a removable discharging door.

14. A coking oven comprising a coking chamber formed between hollow internally heated coking walls which are relatively movable with respect to each other and which on their outer narrow non-coking faces are exposed to and accessible from the atmosphere, removable sealing doors along the top and bottom openings of the coking chamber, an offtake for distillate gases for said coking chamber and means for sealing said chamber from the atmosphere along its outer narrow non-coking faces.

15. A coking oven comprising a coking chamber formed between hollow internally heated coking walls which are relatively movable with respect to each other and which are constructed of non-metallic refractory material, such as firebrick, and which on their outer narrow non-coking faces are exposed to and accessible from the atmosphere, metal frameplates secured around the narrow non-coking faces of each wall and pressed resiliently upon said faces, an offtake for distillate gases for said coking chamber and means for sealing the chamber from the atmosphere along its outer narrow faces.

16. A coking oven comprising a coking chamber formed between hollow coking walls which are relatively movable with respect to each other and which are constructed of non-metallic refractory material, such as firebrick, and which on their outer narrow non-coking faces are exposed to and are accessible from the atmosphere, metal frameplates pressed resiliently upon the four narrow non-coking faces of each wall and formed with flanges gripping the broad faces of the wall, an offtake for distillate gases for said coking chamber and means for sealing the chamber from the atmosphere along its outer narrow faces.

17. A coking oven comprising hollow internally heated coking walls which are relatively movable with respect to each other and which are constructed of refractory material such as firebricks, each movable wall individually surrounded on its narrow outer non-coking faces by an iron framework adapted for firmly holding the bricks of the wall in their relative positions, each iron frame on its outer sides exposed to and accessible from the atmosphere, a carbonizing chamber sandwiched between each two of said coking walls, means for sealing each chamber individually from the atmosphere along its outer narrow faces and means for drawing off the distillation gases.

18. A coking oven comprising hollow internally heated coking walls which are relatively movable with respect to each other and which are constructed of firebricks, each movable wall on its outer narrow non-coking faces individually surrounded by an iron framework, carbonizing chambers sandwiched between said coking walls, a continuous ring of sealing means completely surrounding the outer narrow faces of each carbonizing chamber, said sealing means being exposed to and accessible from the atmosphere and means for drawing off the distillation gases.

19. A coking oven comprising a coking chamber formed between hollow internally heated coking walls which are relatively movable with respect to each other, the outer narrow non-coking faces of said walls being exposed to and accessible from the atmosphere, sealing means adapted for sealing the outer faces of said coking chamber against the atmosphere, said sealing means being exposed to and accessible from the atmosphere and located intermediate of said narrow non-coking faces and means for drawing off the distillation gases.

20. A coking oven comprising a coking chamber formed between hollow coking walls of which at least one is movable towards and away from the other, said walls on their outer narrow non-coking faces being exposed to and accessible from the atmosphere, means for moving at least one of the walls towards and away from the other, inlet and outlet pipes to said walls serving to pass heating gases through the walls, flexible joints in those of said pipes serving the movable wall, an offtake for distillate gases from said coking chamber and means for sealing the chamber from the atmosphere along its outer narrow faces.

21. A coking oven comprising a coking chamber formed between hollow coking walls which are relatively movable with respect to each other which on their outer narrow non-coking faces are exposed to and accessible from the atmosphere, each wall being in the form of a hollow vertical brick prism formed with a depression on its broad coking face, the depressions of two adjacent walls, when placed together, forming a coking chamber, an offtake for distillate gases from said coking chamber and means for sealing the chamber from the atmosphere along its outer narrow faces.

22. A coking oven comprising coking chambers formed between hollow, internally heated coking walls which are relatively movable with respect to each other, connected with each movable wall individual flexible means for supplying heating gases thereto and individual flexible means for taking waste heat therefrom, connected with each coking chamber is means for individually sealing the chamber against the atmosphere, and individual flexible offtakes for distillate gases and means for closing each distillate offtake independently of the others.

23. A coking oven comprising a plurality of coking chambers formed between hollow, internally heated coking walls which are relatively movable with respect to each other, connected with each movable wall individual flexible means for supplying heating gases thereto and individual flexible means for taking waste gases therefrom, connected with each coking chamber is means for individually sealing the chamber against the atmosphere, and flexible offtakes for distillate gases connected with sets of at least two inter-communicating coking chambers, and means for closing each distillate offtake independently of the others.

FRANZ PUENING.